(12) United States Patent
Hong et al.

(10) Patent No.: US 7,713,780 B2
(45) Date of Patent: May 11, 2010

(54) METHOD OF MULTI-PROCESSING OBJECT USING POLYGON MIRROR

(75) Inventors: Eun-Jeong Hong, Gyeonggi-do (KR); Hak-Yong Lee, Seoul (KR); Tae-Kyoung Ryoo, Gyeonggi-do (KR)

(73) Assignee: EO Technics Co., Ltd., Gyeonggi-do (KR)

( * ) Notice: Subject to any disclaimer, the term of this patent is extended or adjusted under 35 U.S.C. 154(b) by 179 days.

(21) Appl. No.: 11/902,602

(22) Filed: Sep. 24, 2007

(65) Prior Publication Data

US 2008/0076234 A1    Mar. 27, 2008

(30) Foreign Application Priority Data

Sep. 27, 2006    (KR) .................... 10-2006-0093962

(51) Int. Cl.
*H01L 21/44*    (2006.01)

(52) U.S. Cl. ..................................... 438/106

(58) Field of Classification Search ................ None
See application file for complete search history.

(56) References Cited

U.S. PATENT DOCUMENTS

| | | | |
|---|---|---|---|
| 6,335,775 B1 * | 1/2002 | Iwamura et al. | 349/125 |
| 6,806,168 B2 | 10/2004 | Towle et al. | |
| 2003/0136769 A1 | 7/2003 | Lin et al. | |
| 2004/0169023 A1 * | 9/2004 | Tanaka | 219/121.73 |
| 2008/0291140 A1 * | 11/2008 | Kent et al. | 345/83 |

FOREIGN PATENT DOCUMENTS

| | | |
|---|---|---|
| EP | 1 586 406 | 10/2005 |
| GB | 2 402 230 | 12/2004 |
| JP | 2003-197561 | 7/2003 |
| KR | 1020000071048 | 11/2000 |
| KR | 1020060012395 | 2/2006 |
| WO | WO-99/30864 | 6/1999 |

* cited by examiner

*Primary Examiner*—Charles D Garber
*Assistant Examiner*—Andre' C Stevenson
(74) *Attorney, Agent, or Firm*—Venable LLP; Jeffri A. Kaminski

(57) ABSTRACT

A method of multi-processing an object using a polygon mirror according to an embodiment of the invention includes setting processing parameters for individual layers of an object having a multilayer structure, performing laser processing on exposed layers in a region to be processed of the object according to the processing parameters using a polygon mirror, determining whether or not all of the layers of the object having a multilayer structure are processed, and if it is determined in the determining that not all of the layers are processed, progressing the performing of laser processing. Therefore, efficiency in processing the object can be increased, and cracks that occur in the object during laser processing using a polygon mirror can be minimized.

13 Claims, 4 Drawing Sheets

METHOD OF MULTI-PROCESSING OBJECT USING POLYGON MIRROR

BACKGROUND OF THE INVENTION

1. Technical Field

The present invention relates to a method of processing an object using a laser, and in particular, to a method of multi-processing an object using a polygon mirror that can optimize processing parameters according to properties of an object to be processed and processing purposes.

2. Related Art

In order to form components with various materials, such as wafers, metals, and plastics, processing procedures, such as cutting and grooving, are generally needed. For example, after a semiconductor manufacturing process is completed, cutting is performed to cut a plurality of chips formed on a wafer into individual chips is performed. The wafer cutting process is important because it affects the quality and productivity during a subsequent process. At present, a mechanical sawing method that uses a diamond blade is generally used.

However, since the semiconductor wafer is reduced in thickness, for example, to 150 μm or less, and various materials, such as low-dielectric-constant materials, are used, there is a problem in using the mechanical sawing method in that chipping occurs and the die strength is weakened. Accordingly, new cutting methods have been considered. Of these, a cutting method using a laser is being studied as a substitute for the mechanical sawing method.

Meanwhile, an object to be processed with a laser may have a single layer or a plurality of layers. If an object having a plurality of layers is processed on the same processing condition without considering different characteristics of the plurality of layers, swelling or explosion may occur at the boundary between the layers.

That is, since the layers have different optical, physical, and chemical characteristics, the object should be processed according to processing parameters for the individual layers. However, in the existing laser processing method, since a one-pass mode is used, cracks may occur at the boundary between the layers, and in the worst case, the cracks may spread to the chip region, which may result in deterioration in the yield. In addition, due to a large influence by the HAZ (Heat Effected Zone), the die strength may be decreased.

SUMMARY OF THE INVENTION

The invention has been finalized in order to solve the above-described problems. An embodiment of the invention provides a method of multi-processing an object using a polygon mirror that can process an object having a multilayer structure using different processing parameters for individual layers, thereby improving processing efficiency.

Another embodiment of the invention provides a method of multi-processing an object using a polygon mirror that can effectively prevent cracks occurring during processing from spreading.

According to an embodiment of the invention, there is provided a method of multi-processing an object using a polygon mirror. The method includes setting different processing parameters for individual layers of an object having a multilayer structure, performing laser processing on exposed layers in a region to be processed of the object according to the set processing parameters using a polygon mirror, determining whether or not all of the layers of the object having a multilayer structure are processed, and if it is determined in the determining that not all of the layers are processed, progressing the performing of laser processing.

According to another embodiment of the invention, there is provided a method of multi-processing an object using a polygon mirror that performs laser processing on an object having a multilayer structure using a polygon mirror. The method includes scribing both edges of a region to be processed of the object having a multilayer structure, setting processing parameters for individual layers of the object having a multilayer structure, performing laser processing on exposed layers in a region to be processed of the object according to the set processing parameters using the polygon mirror, determining whether or not all of the layers of the object having a multilayer structure are processed, and if it is determined in the determining that not all of the layers are processed, progressing the performing of laser processing.

According to still another embodiment of the invention, there is provided a method of multi-processing an object using a polygon mirror that performs laser processing on an object having a multilayer structure using a polygon mirror. The method includes setting processing parameters for individual layers of the object having a multilayer structure, performing laser processing on exposed layers in a region to be processed of the object according to the set processing parameters using the polygon mirror, determining whether or not all of the layers of the object having a multilayer structure are processed, if it is determined in the determining that not all of the layers are processed, progressing the performing of laser processing, and healing the region to be processed of the object.

DESCRIPTION OF EXEMPLARY EMBODIMENTS

Hereinafter, exemplary embodiments of the invention will be described in detail with reference to the accompanying drawings.

In the exemplary embodiments of the invention, a laser processing apparatus using a polygon mirror is used in order to maximize processing efficiency when an object is processed. The laser processing apparatus using a polygon mirror has been described in Korean Patent Application No. 10-2004-0022270, which is filed by the applicant of the invention in the Korean Intellectual Property Office on Mar. 31, 2004. A polygon mirror has a plurality of reflecting surfaces having the same length and rotates around a rotation axis. A description will now be given with reference to FIG. 1.

Figure 1:
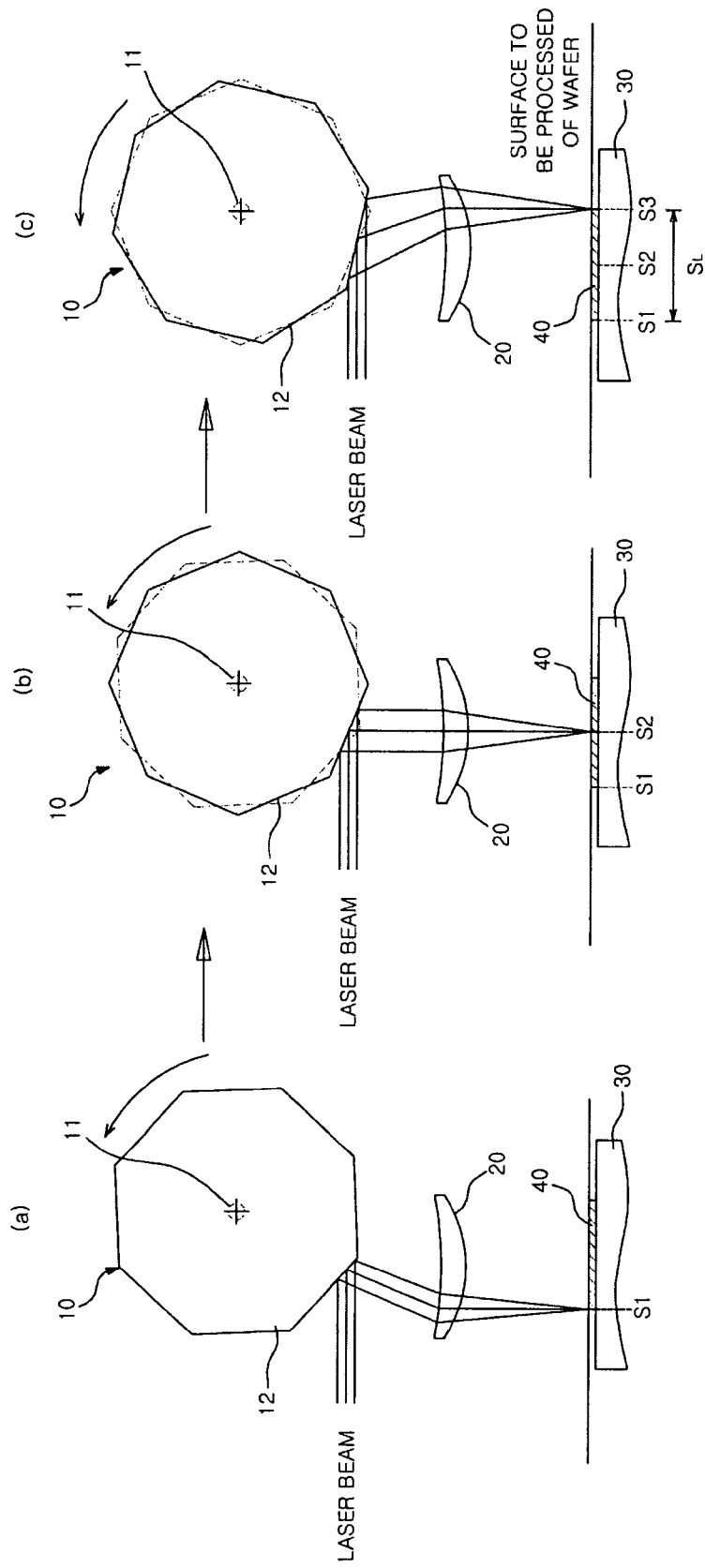
FIG. 1 is a diagram showing the configuration of a laser processing apparatus using a polygon mirror that is applied to the invention.

FIG. 1 is a diagram showing the configuration of a laser processing apparatus using a polygon mirror that is applied to the invention.

As shown in FIG. 1, a laser processing apparatus using a polygon mirror includes a polygon mirror 10 that has a plurality of reflecting surfaces 12 and rotates around a rotation axis 11, and a lens 20 that collects laser beams reflected from the reflecting surfaces 12 of the polygon mirror 10. Here, the lens 20 is provided to face a stage 30, on which an object 40 (for example, wafer) to be cut is placed, to collect the laser beams reflected from the reflecting surfaces 12 of the polygon mirror 10.

When the polygon mirror 10 rotates, as shown in (a) of FIG. 1, the laser beams are reflected from a start portion of the reflecting surface 12, and the reflected laser beams are incident on a left end of the lens 20. Accordingly, the reflected laser beams are collected by the lens 20 and vertically irradiated at a corresponding location S1 of the object 40.

Next, as shown in (b) of FIG. 1, when the polygon mirror 10 further rotates, the laser beams are reflected from a middle portion of the reflecting surface 12, and the reflected laser beams are incident on a center portion of the lens 20. The incident laser beam are collected by the lens 20 and vertically irradiated at a corresponding location S2 of the wafer.

Next, as shown in (c) of FIG. 1, when the polygon mirror 10 still further rotates, the laser beams are reflected from an end portion of the reflecting surface 12, and the reflected laser beams are incident on a right end of the lens 20. Accordingly, the incident laser beams are collected by the lens 20 and vertically irradiated at a corresponding location S3 of the wafer.

As such, when the polygon mirror 10 rotates, the laser beams are irradiated from the location S1 on the object 40 to the location S3. A length from the location S1 to the location S3 is referred to as a scanning length $S_L$ that is processed by one reflecting surface 12 of the polygon mirror 10. In addition, an angle between the laser beams reflected from the start portion and the end portion of the reflecting surface 12 is referred to as a scanning angle.

When the laser processing apparatus using the above-described polygon mirror is used, the object can be processed with high accuracy and at a high speed.

Figure 2:
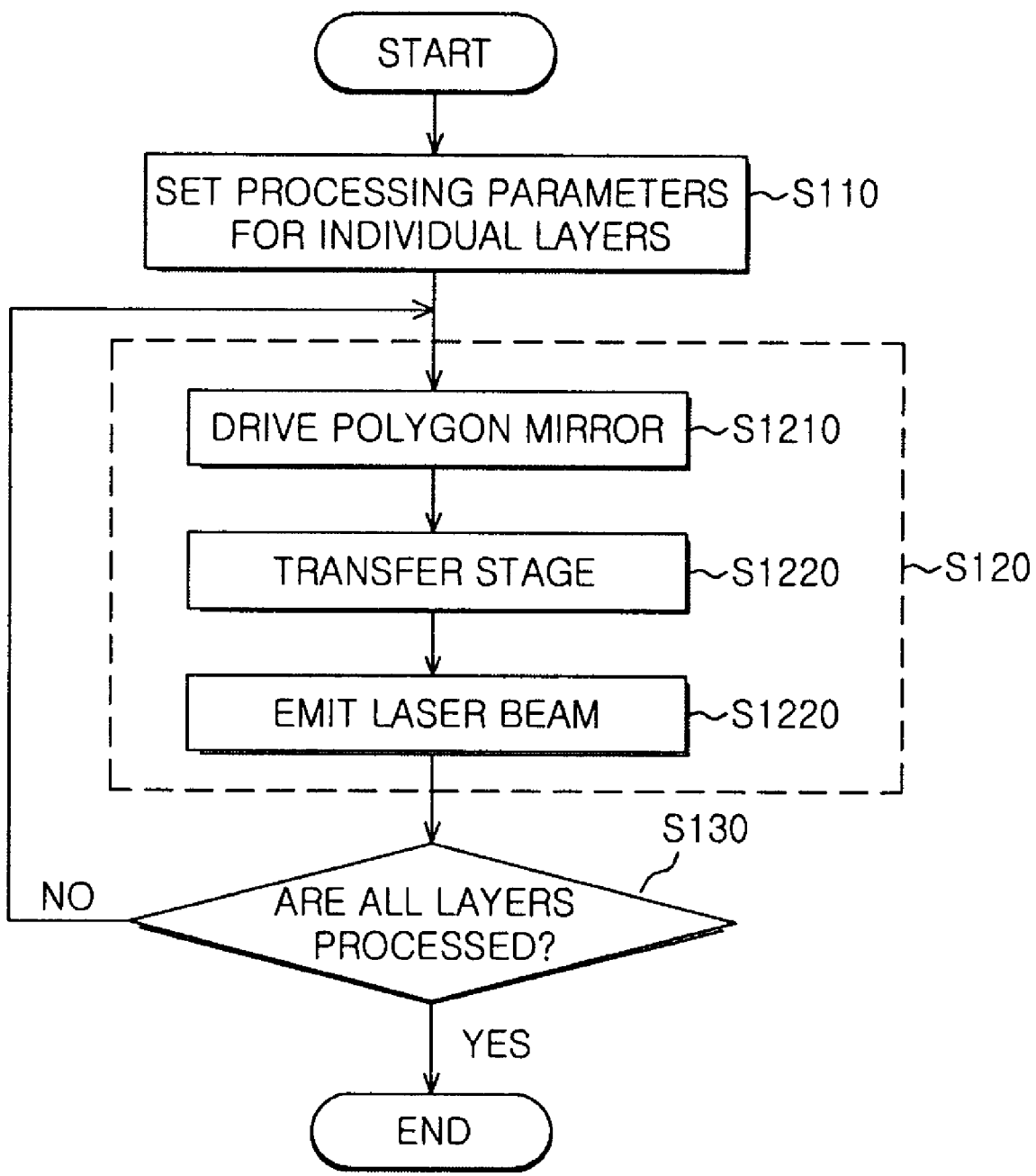
FIG. 2 is a flowchart illustrating a method of multi-processing an object according to an embodiment of the invention.

FIG. 2 is a flowchart illustrating a method of multi-processing an object according to an embodiment of the invention.

In this embodiment, the laser processing apparatus using the above-described polygon mirror is used to process an object having a multilayer structure.

To this end, first, processing parameters of the object for individual layers are set (Step S110). The prescribed processing parameters include laser output power, a rotation speed of the polygon mirror, a transfer speed of the stage on which the object is placed, an irradiation frequency of the laser beam, and a focal position of the laser beam.

After the processing parameters for the individual layers are set, the laser processing apparatus using the polygon mirror is driven to process exposed layers of the object (Step S120). If an exposed upper layer in a region to be processed is processed, it is determined whether or not all of the layers are processed (Step S130). If all of the layers are processed, the process ends. Otherwise, that is, if the layers to be processed remain, the process returns to Step S120.

Here, the step of processing the exposed layers of the object (Step S120) will be described in detail. First, the polygon mirror is driven (Step S1210), and the stage on which the object is placed is transferred (Step S1220). At this time, the stage is preferably transferred in a direction opposite to a processing direction. Subsequently, the laser beams are emitted (Step S1230), and the emitted laser beams are reflected from the reflecting surfaces of the polygon mirror and irradiated onto the object through the lens.

In such a manner, in this embodiment, when the object having a multilayer structure is processed, the optimum processing parameters for the individual layers are set, such that the layers are processed according to different processing parameters. Therefore, swelling or explosion can be prevented from occurring at the boundary between the layers.

Figure 3:
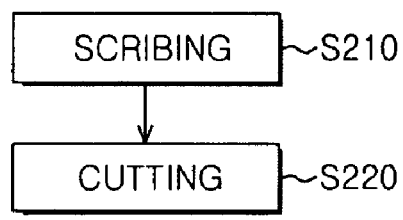
FIG. 3 is a flowchart illustrating a method of multi-processing an object according to another embodiment of the invention.

FIG. 3 is a flowchart illustrating a method of multi-processing an object according to another embodiment of the invention.

In the method of processing an object according to this embodiment include scribing (Step S210), and laser cutting using a polygon mirror (Step S220).

When an object having a multilayer structure is directly processed by laser, cracks may occur due to a difference in characteristic between the layers. When the cracks spread to an active region (chip region), manufacturing yield may be deteriorated. For this reason, both edges of a region to be processed are scribed before laser processing, and then cutting is performed by laser processing. Therefore, the rate of the cracks can be reduced.

Figure 4A:
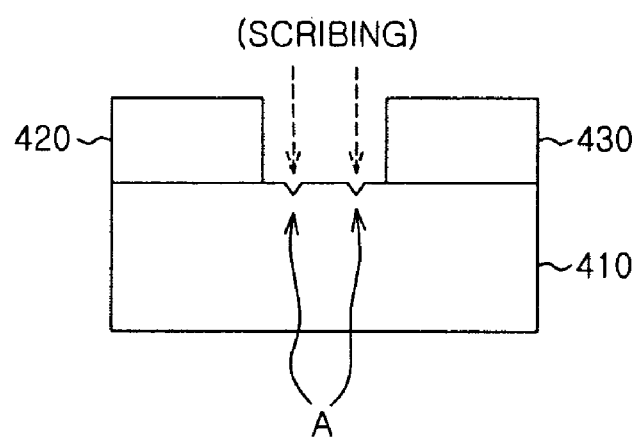
FIGS. 4A and 4B are diagrams illustrating an example where an object is processed by the processing method described with reference to FIG. 3.
Figure 4B:
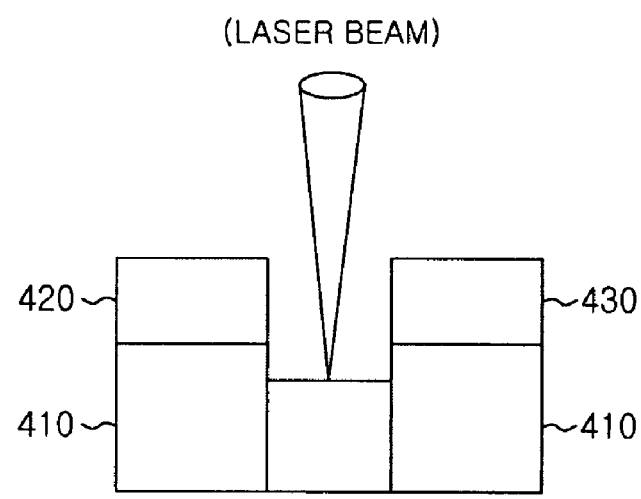

FIGS. 4A and 4B are diagrams illustrating an example where an object is processed by the processing method described with reference to FIG. 3.

As shown in FIG. 4a, when active regions 420 and 430 are formed in a semiconductor substrate 410, and then cutting is performed to separate the active regions from each other, first, edges A of the region to be processed are processed by scribing.

Subsequently, as shown in FIG. 4B, the region to be processed is removed by the polygon mirror. Here, when the region to be processed of the semiconductor substrate 410 has a multilayer structure, similarly to FIG. 2, the semiconductor substrate 410 is preferably processed using different processing parameters for the individual layers.

In this embodiment, scribing may be performed by the laser processing apparatus using a polygon mirror.

Though not shown, if healing is performed after cutting (Step S220), the cracks that occur during cutting with a laser can be effectively removed.

Figure 5:
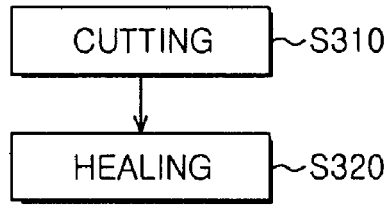
FIG. 5 is a flowchart illustrating a method of multi-processing an object according to still another embodiment of the invention.

FIG. 5 is a flowchart illustrating a method of multi-processing an object according to still another embodiment of the invention.

When laser processing is performed on the object having a multilayer structure, cracks may occur in the portion to be processed and spread to the active regions. In this embodiment, in order to prevent the cracks from spreading, after the object is cut (Step S310), the cut portion is healed (Step S320).

Specifically, first, the region to be processed is cut by the laser processing apparatus using the polygon mirror. At this time, when the object to be processed has a multilayer structure, the object is preferably processed according to different processing parameters for the individual layers by the processing method described with reference to FIG. 2.

If cracks occur in the portion to be processed during cutting, healing is performed to bond the cracked portions, thereby increasing processing efficiency.

Figure 6A:
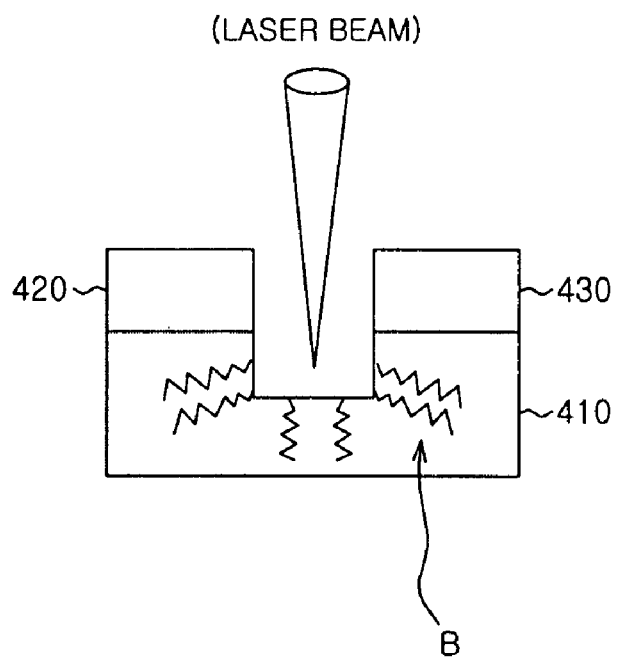
FIGS. 6A and 6B are diagrams illustrating an example where an object is processed by the processing method described with reference to FIG. 5.
Figure 6B:
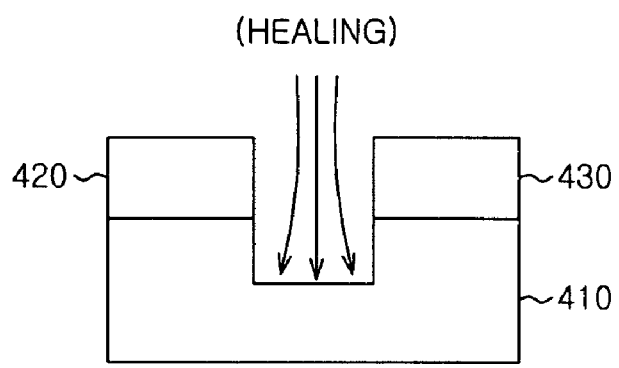

FIGS. 6A and 6B are diagrams illustrating an example where an object is processed by the processing method described with reference to FIG. 5.

Referring to FIG. 6A, it can be seen that, when a semiconductor substrate 410, in which active regions 420 and 430 are formed, is subjected to laser processing using a polygon mirror, cracks B occur in the portion to be processed of the substrate 410.

In this case, if healing is performed as shown in FIG. 6B, the cracked portions are bonded. For example, in a case of a silicon (Si) substrate, the substrate is turned into silicon dioxide ($SiO_2$) by healing, and then the cracked portions are bonded. Accordingly, the cracks can be prevented from spreading to the active regions.

In summary, according to the embodiments of the invention, before an object having a multilayer structure is processed, different processing parameters for individual layers are set, and the layers are sequentially processed. Therefore, processing reliability and die strength can be improved.

In addition, before multi processing is performed using a polygon mirror, edges of a portion to be processed are scribed, and thus it is possible to deal with the cracks that occur during laser processing. Furthermore, when the cracks occur, the cracked portions are bonded by healing, and thus it is possible to prevent the cracks from spreading.

It will be apparent to those skilled in the art that various modifications and changes may be made without departing from the scope and spirit of the invention. Therefore, it should be understood that the above embodiment is not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

According to the embodiments of the invention, an object having a plurality of layers with different characteristics is processed according to optimum processing parameters for the individual layers, thereby increasing the processing efficiency.

In addition, during laser processing with a polygon mirror, the cracks that occur in the object can be minimized, and even if the cracks occur, since healing is performed, the cracks can be prevented from spreading. As a result, the manufacturing yield and reliability of the device can be significantly improved.

What is claimed is:

1. A method of multi-processing an object using a polygon mirror that performs laser processing on an object having a multilayer structure using a polygon mirror, the method comprising:
    setting processing parameters for individual layers of the object having the multilayer structure, at least two of the layers having different processing parameters;
    performing laser processing on exposed ones of the individual layers in a region to be processed of the object according to the set processing parameters for the respective individual layers using the polygon mirror;
    determining whether or not all of the layers of the object having the multilayer structure are processed; and
    if it is determined in the determining that not all of the layers are processed, progressing the performing of laser processing.

2. The method of claim 1, wherein the performing of laser processing includes:
    driving the polygon mirror;
    transferring a stage, on which the object is placed; and
    emitting a laser beam and causing the emitted laser beam to be reflected from a reflecting surface of the polygon mirror and irradiated onto the region to be processed of the object through a lens.

3. The method of claim 2, wherein the stage is transferred in a direction opposite to a direction in which the laser beam is irradiated.

4. The method of claim 1, wherein the processing parameters include laser output power, a rotation speed of the polygon mirror, a transfer speed of the stage on which the object is placed, an irradiation frequency of the laser beam, and a focal position of the laser beam.

5. A method of multi-processing an object using a polygon mirror that performs laser processing on an object having a multilayer structure using a polygon mirror, the method comprising:
    scribing both edges of a region to be processed of the object having a multilayer structure;
    setting processing parameters for individual layers of the object having a multilayer structure;
    performing laser processing on exposed layers in the region to be processed of the object according to the set processing parameters using the polygon mirror;
    determining whether or not all of the layers of the object having a multilayer structure are processed; and
    if it is determined in the determining that not all of the layers are processed, progressing the performing of laser processing.

6. The method of claim 5, wherein the performing of laser processing includes cutting the exposed layers.

7. The method of claim 5, wherein the performing of laser processing includes:
    driving the polygon mirror;
    transferring a stage on which the object is placed; and
    emitting a laser beam and causing the emitted laser beam to be reflected from a reflecting surface of the polygon mirror and irradiated onto the region to be processed of the object through a lens.

8. The method of claim 5, wherein the processing parameters include laser output power, a rotation speed of the polygon mirror, a transfer speed of the stage on which the object is placed, an irradiation frequency of the laser beam, and a focal position of the laser beam.

9. The method of claim 5, further comprising, after the progressing: healing the region to be processed.

10. A method of multi-processing an object using a polygon mirror that performs laser processing on an object having a multilayer structure using a polygon mirror, the method comprising:
    setting processing parameters for individual layers of the object having the multilayer structure, at least two of the layers having different processing parameters;
    performing laser processing on exposed layers in a region to be processed of the object according to the set processing parameters for the respective individual layers using the polygon mirror;
    determining whether or not all of the layers of the object having the multilayer structure are processed;
    if it is determined in the determining that not all of the layers are processed, progressing the performing of laser processing; and
    healing the region to be processed of the object.

11. The method of claim 10, wherein the performing of laser processing includes cutting the exposed layers.

12. The method of claim 10, wherein the performing of laser processing includes:
driving the polygon mirror;
transferring a stage on which the object is placed; and
emitting a laser beam and causing the emitted laser beam to be reflected from a reflecting surface of the polygon mirror and irradiated onto the region to be processed of the object through a lens.

13. The method of claim 10, wherein the processing parameters include laser output power, a rotation speed of the polygon mirror, a transfer speed of the stage on which the object is placed, an irradiation frequency of the laser beam, and a focal position of the laser beam.

* * * * *